United States Patent [19]

Morrison

[11] Patent Number: 5,224,042
[45] Date of Patent: Jun. 29, 1993

[54] FOUR WHEEL STEERING SYSTEM WITH SPEED-DEPENDENT PHASE REVERSAL

[75] Inventor: Scott D. Morrison, Rochester, Mich.

[73] Assignee: General Motors Corporation, Detroit, Mich.

[21] Appl. No.: 657,783

[22] Filed: Feb. 19, 1991

[51] Int. Cl.⁵ .............................................. B62D 5/04
[52] U.S. Cl. ............................... 364/424.05; 180/142; 180/140; 280/91
[58] Field of Search ............. 364/424.01, 424.05; 180/79, 79.1, 140–143; 280/91

[56] References Cited

U.S. PATENT DOCUMENTS

| | | | |
|---|---|---|---|
| 4,666,013 | 5/1987 | Shibahata et al. | 180/141 |
| 4,697,816 | 6/1987 | Kawamoto et al. | 180/143 X |
| 4,705,131 | 11/1987 | Shibahata et al. | 180/140 |
| 4,730,839 | 3/1988 | Miyoshi | 180/143 X |
| 4,773,498 | 9/1988 | Eto et al. | 180/79.1 |
| 4,828,061 | 5/1989 | Kimbrough et al. | 180/79.1 |
| 4,836,319 | 6/1989 | Haseda et al. | 180/142 |
| 4,842,089 | 6/1989 | Kimbrough et al. | 180/79.1 |
| 4,893,690 | 1/1990 | Mori et al. | 180/140 |
| 4,949,261 | 4/1990 | Ito et al. | 364/424.05 |
| 5,099,938 | 3/1992 | Watanabe et al. | 180/140 |

OTHER PUBLICATIONS

"Development of 'Super HICAS', a New Rear Wheel Steering System with Phasereversal Control", Eguchi et al, SAE Tech. Paper Series #891978, Sep. 1989.

"A Review of Four-Wheel Steering Studies from the Viewpoint of Vehicle Dynamics and Control", Furukawa et al, Vehicle System Dynamics, No. 18, pp. 151–186 (Dec. 1989).

*Primary Examiner*—Parshotam S. Lall
*Assistant Examiner*—Thomas S. Auchterlonie
*Attorney, Agent, or Firm*—Mark A. Navarre

[57] ABSTRACT

A four wheel steer control system which uses vehicle speed, front wheel position, and the rate of change of the front wheel position to develop the rear wheel steering command. The rear steering command is a combination of the steady state and transient rear wheel commands which are developed individually. The rear wheel steady state command is a function of vehicle speed and front wheel position. The rear wheel transient command is a function of the rate of change of the front wheel position and vehicle speed. Determining the rate of change of front wheel position is done by taking samples of the front wheel position over time and calculating the difference in position between consecutive samples. As the vehicle speed changes the number of differences which are used to calculate the rate of change varies, allowing for the constant tuning of the response time of the rear wheels, resulting in a vehicle which is optimized for response and stability over the entire range of vehicle speeds.

2 Claims, 3 Drawing Sheets

FOUR WHEEL STEERING SYSTEM WITH SPEED-DEPENDENT PHASE REVERSAL

This invention relates to control of rear wheel steering in a four wheel steer vehicle, in particular, to a method for improving the vehicle response by varying the manner in which the rear wheel steering commands are generated in accordance with the vehicle speed and the rate of change of the front wheel position.

BACKGROUND OF THE INVENTION

Initial four wheel steering systems on automotive vehicles determined the rear wheel steer angle strictly as a function of the front wheel steer angle. The initial systems did not distinguish between steady state and transient steering maneuvers. In steady state operation, the vehicle sideslip was reduced, but during transient maneuvers the vehicle sideslip generated was in a negative direction, toward the inside of a turn, causing a non-responsive feeling for the driver. Additionally, there was no improvement in generating the rotational force, yaw motion, in the direction that the vehicle was turning.

The apparent non-responsiveness is a result of the basic front wheel steer vehicle handling characteristics as compared to the four wheel steer vehicle handling characteristics. When the driver initiates a transient maneuver, the vehicle experiences both yaw and lateral acceleration. Lateral acceleration is the cornering force on the vehicle. Yaw is rotational motion about the vehicle center of gravity. In a front wheel steer vehicle, these forces occur at approximately the same time, causing the driver to feel pushed toward the outside of the turning circle. In a conventional four wheel steer vehicle, where rear wheel steer angle is a function of front wheel position only, the generation of the yaw sensation is delayed so that the lateral acceleration occurs first. This causes the driver to feel pulled into the turn as compared to being pushed away from the turn as in a two wheel steer vehicle. Such a four wheel steer system is called a proportional system because the rear wheels are positioned in proportion to the front wheels. This system has been improved by making the rear wheel position dependent not only on the front wheel position, but also on vehicle speed. This enables the rear wheel position to be tailored specifically in accordance with front wheel position and vehicle speed. As such, at higher vehicle speeds, the rear wheels will steer more in phase with the front wheels than at lower vehicle speeds for the same front wheel position, adding stability.

In more recent four wheel steer systems, it has been proposed to delay or momentarily reverse the rear steering relative to the rate of change of front steering. This quickens the generation of yaw velocity with the intent of bringing lateral acceleration and yaw velocity into phase.

SUMMARY OF THE PRESENT INVENTION

The present invention is directed to an improved four wheel steer system wherein the rear steering command is developed as a function of the rate of change of front steering, and wherein the method of determining the rate of change of front steering is varied in relation to vehicle speed. According to this invention, the rate of change, or derivative, of front wheel position is determined by taking the difference between successive front wheel position measurements sampled over periodic time intervals, then averaging these differences. The derivative changes the time constant of the system, that is, the speed with which the system responds to a change in front wheel position. By varying the number of differences that are averaged to calculate the derivative in relation to vehicle speed, the time constant of the system can be tuned. By tuning the time constant—that is, the speed with which the system responds to a change in front wheel position—with vehicle speed, a vehicle can be made more responsive at medium vehicle speeds while maintaining a high level of stability at higher vehicle speeds. The result is a vehicle that is optimized for response and stability over the entire range of vehicle speeds.

The front wheel angle and vehicle speed are used to determine the steady state component of the rear wheel steer angle during a maneuver. The front wheel angle, vehicle speed, and rate of change of the front wheel position are used to determine the transient component of the rear wheel angle during a maneuver. The rear wheel steering angle is determined according to the combination of the steady state and transient components. Vehicle speed is used for two purposes during a transient maneuver: the first purpose is to determine the number of samples to use to calculate the derivative of the front wheel position, and the second purpose is as an input variable used in a table lookup to determine the transient gain of the rear wheels.

DETAILED DESCRIPTION OF THE INVENTION

Figure 1:
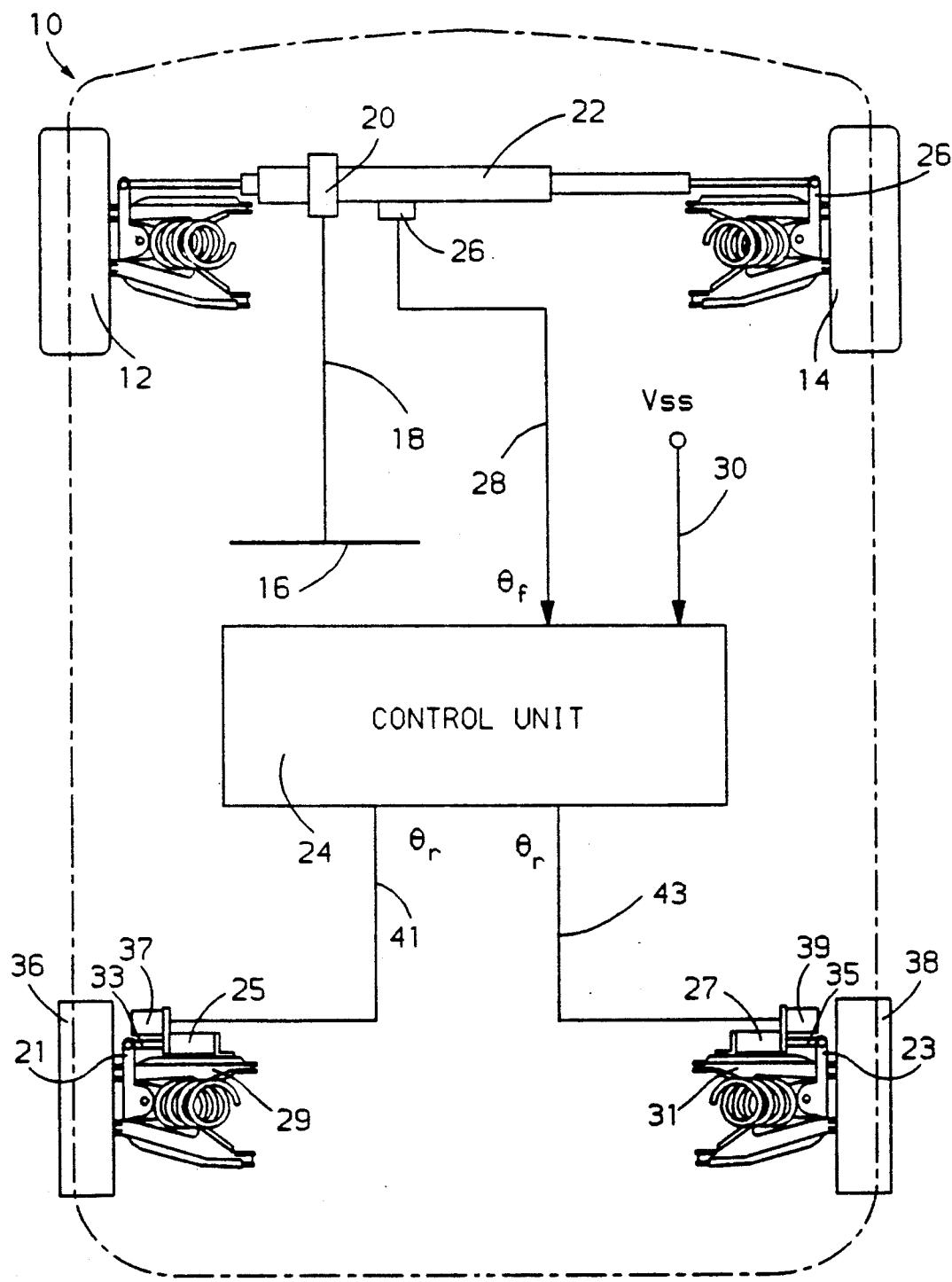
FIG. 1 is a system diagram, including a computer based control unit, of a four wheel steer system.

Referring now particularly to FIG. 1, the reference numeral 10 generally designates a motor vehicle having four steerable wheels. The front wheels 12, 14 are steered together in response to rotation of a driver operated steering wheel 16. The hand-wheel 16 is mechanically connected via steering column 18 to a pinion gear 20, which is maintained in meshing engagement with teeth formed on a front rack 22 which, in turn, is connected to front wheel tie rods (not shown), completing the mechanical linkage connecting the front wheels 12, 14 to the hand-wheel 16.

A position sensor 26 responsive to axial displacement of the front rack 22 provides a rack position signal as an input to control unit 24 via line 28. The signal that is input is the position $\theta_f$ of the front wheels as positioned by the vehicle operator while rotating the steering wheel 16. In addition to the front wheel position, the vehicle speed Vss is input into the control unit 24 as detected by a vehicle speed sensor (not shown) through vehicle speed signal input line 30.

The rear wheels 36, 38 are provided with steering knuckles 21, 23 for effecting limited positioning and steering of the same. Each rear wheel assembly includes a linear actuator comprising an electric motor 37, 39 operating through a conventional ball-screw mechanism 25, 27. The actuators are mounted on lower control arms 29, 31 and are coupled to steering knuckles 21, 23 via linkages 33, 35. The linear actuators 25, 27 include an electric motor 37, 39, operating through a generally conventional ball-screw mechanism (not shown). The electric motors 37, 39 are controlled by signals sent by the control unit 24 via lines 41, 43, respectively. The computer based control unit 24 develops one rear wheel steer angle command which causes the rear wheels to move in unison, but sends each electric motor 37, 39 separate control signals to produce a desired rear wheel turning angle.

Figure 2:
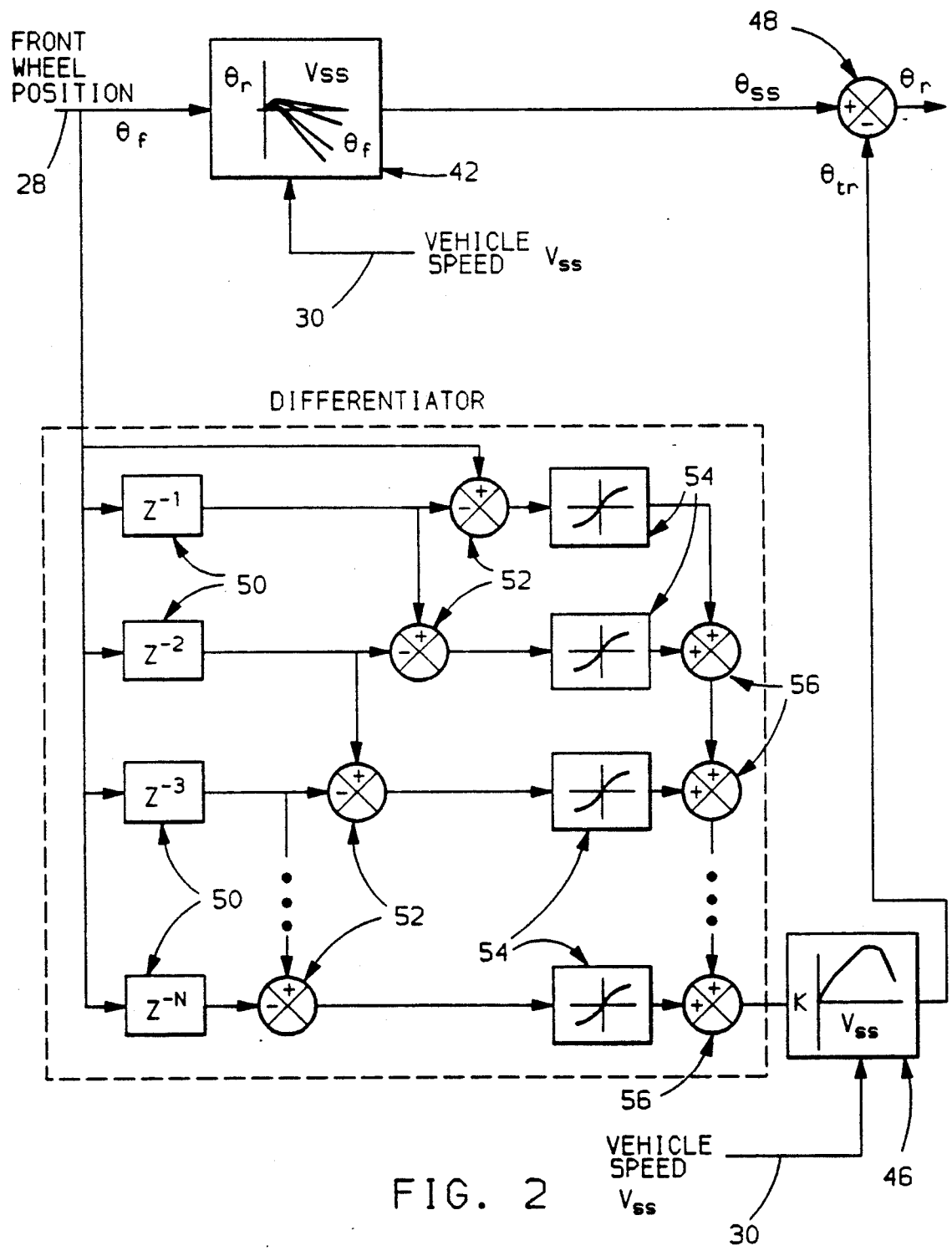
FIG. 2 is a block diagram of the control system used to determine the rear wheel position.

FIG. 2 is a block diagram of the control algorithm employed by the rear wheel steer controller 24 to implement the improved method of this invention for rear wheel steer transient response. The two inputs into the system are the front wheel position ($\theta_f$) fed to the controller on input line 28 and the vehicle speed signal (Vss) on line 30. The control algorithm develops two separate components of the rear wheel steer angle ($\theta_r$): a steady state command component $\theta_{ss}$) and a transient command component $\theta_{tr}$). The steady state and transient component commands are then combined to form the rear wheel steer command $\theta_r$. The $\theta_{ss}$ component is determined by a table look up, while the $\theta_{tr}$ component is calculated based on the front wheel position rate of change and a derivative gain as describe below.

The steady state and transient commands are developed separately and will be examined as such. The steady state command is a function of vehicle speed and front wheel position. While in steady state operation at a specific vehicle speed, the ratio of the rear wheel position to the front wheel position ($\theta_r/\theta_f$) remains constant. The front wheel position $\theta_f$ is fed into the controller 24 and is used in conjunction with vehicle speed to determine the rear wheel steady state position. At block 42 $\theta_r$ is determined as a function of the front wheel steering angle and the vehicle speed.

Figure 3:
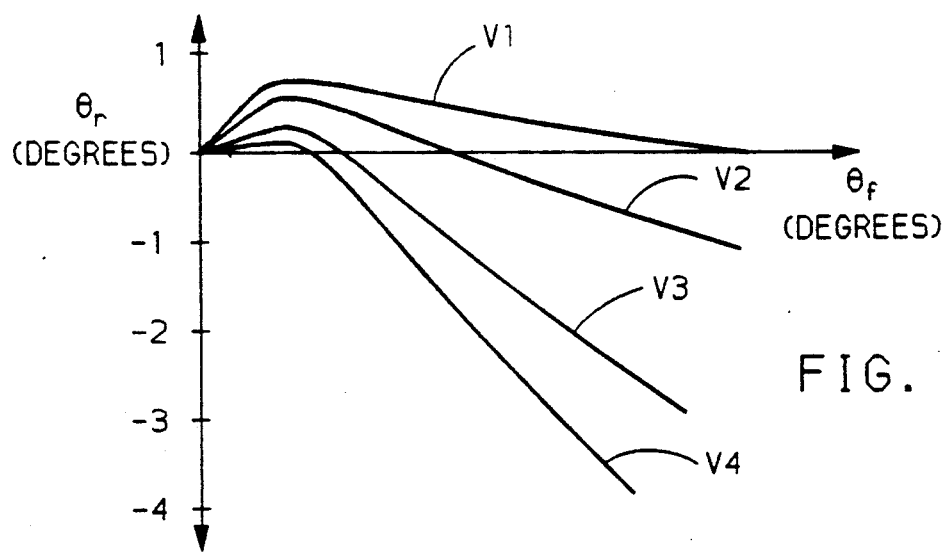
FIG. 3 is a graph that depicts a typical relation between the front wheel position and the rear wheel position at a given vehicle speed during steady state operation.

FIG. 3 graphically depicts a typical relationship between $\theta_r$ and $\theta_f$ for various vehicle speeds. Positive $\theta_r$ values denote in-phase steering while negative $\theta_r$ values denote out-of-phase steering. At low vehicle speeds V1, V2, the rear steering is primarily out-of-phase with the front wheel steering. However, at increasing vehicle speeds V3, V4, the rear steering is primarily in-phase with the front steering. Preferably, data representing the traces of FIG. 3 is stored in a three dimensional look-up table in control unit 24 so that a desired rear steering angle $\theta_r$ may be retrieved as a combined function of front steering angle $\theta_f$ and vehicle speed Vss.

The transient command is developed by calculating the rate of change of the front wheel position and multiplying by a derivative gain term based on the vehicle speed. The derivative of the front wheel position is the rate of change of the front wheel position with respect to time, and the method of its calculation varies with respect to the speed at which the vehicle is traveling. It is obtained in the following manner. The controller samples $\theta_f$ at fixed time intervals. The sample is represented as a discrete sample at the boxes numbered 50 in FIG. 2. Each box holds a different discrete sample. For example $Z^{-1}$ holds the last stored sample, $Z^{-2}$ holds the next to last stored sample, etc. The notation used is similar for summing junctions 52, 56 and limiters 54 in that each identically numbered element performs the same function except that it operates on a different sample. The current $\theta_f$ is subtracted from the previous value of $\theta_f$ as measured in the previous sample interval at summing junctions 52. This difference is the change in the front wheel position over the fixed sampling interval and would represent a rate of change over that interval if divided by the sample period. Because the sample period remains fixed, comparing the differences is in effect a comparison of the rates. Effective use of this fact alleviates the need to divide to find the actual rate of change for a given speed. The differences between successive intervals are filtered for noise at limiters 54. The limited differences are averaged at summing junctions 56 to determine the rate of change of the front wheel position over the number of samples used to calculate the derivative.

Discrete samples 50, summing junctions 52, 56, and limiters 54 are duplicated for the desired number n of samples, as schematically represented in FIG. 2. According to this invention, the number n of stored samples used by the controller to calculate the front steering angle derivative is represented in the discrete manner $Z^{-n}$, where n varies in direct relation to vehicle speed. Varying the number of samples is advantageous because it provides a relatively quick rear wheel response at higher vehicle speeds, producing a more stable vehicle. Because a relatively small number of samples is taken at higher vehicle speeds, the total time between the first and last sample is less than when a greater number of samples are taken. This results in less phase lag and a rear wheel steer command that is a more immediate response to the rate of change of the front wheel position, rather than a command that is in response to the rate of change of the front wheel position as measured over a longer period of time. On the other hand, taking more samples at lower vehicle speeds increases the phase lag of the rear wheel response. The increased phase lag makes the rear wheel steering command smoother than at higher vehicle speeds so that the rear wheel command is not reacting too quickly to the change in front wheel position.

Figure 4:
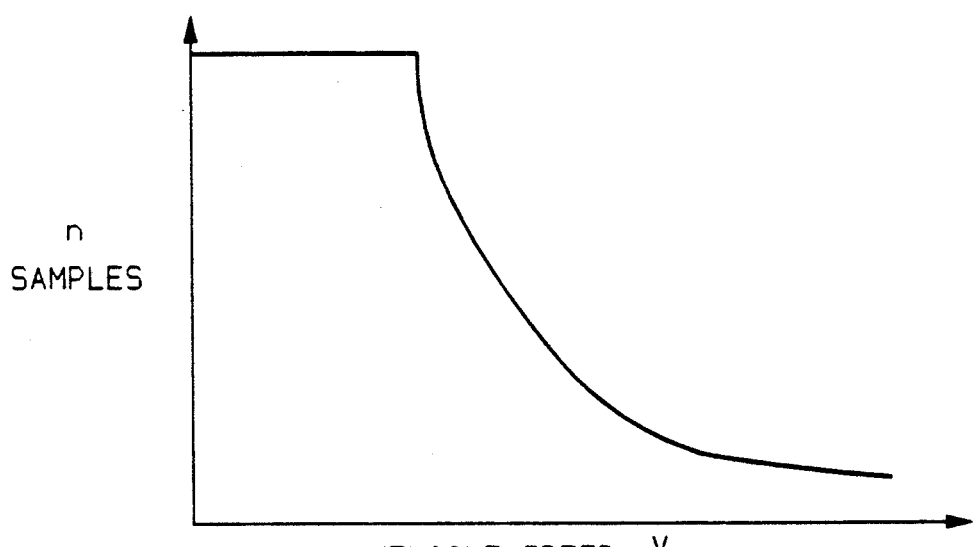
FIG. 4 is a graph which depicts the relation between the number of samples used to calculate the derivative and the vehicle speed.

FIG. 4 depicts a graph that illustrates the relationship between Vss and the number of samples n to use in calculating the derivative. The number of samples remains fairly high until Vss reaches a threshold speed such as 40 mph at which point the number of samples used to calculate the rate of change of front wheel position decreases. At speeds below the threshold speed, the number of samples remains fixed because there is no need to take fewer samples as the vehicle will already handle in a stable manner.

Figure 5:
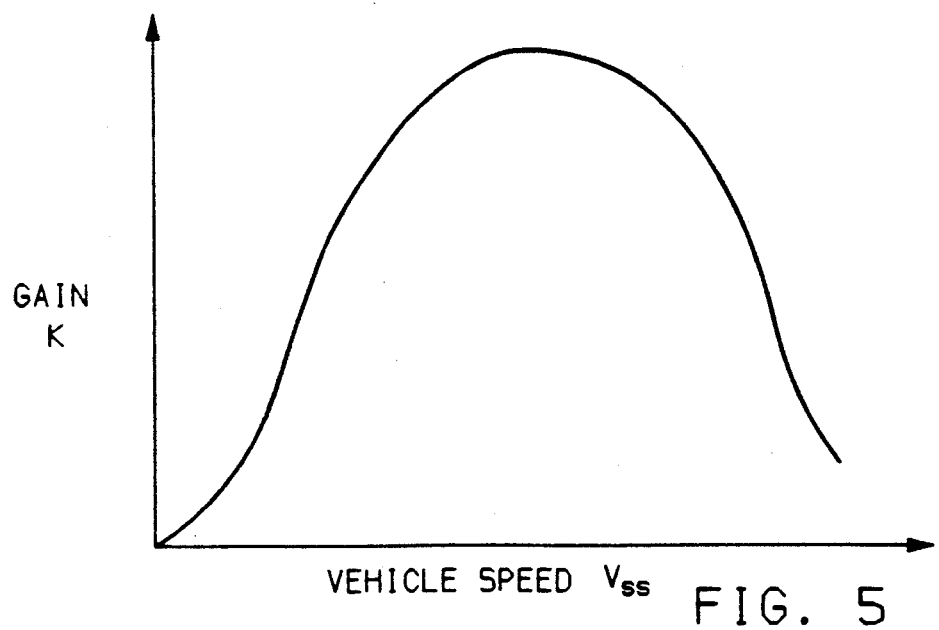
FIG. 5 depicts a typical derivative gain table used to determine rear wheel position where the gain is a function of vehicle speed.

Once the derivative is calculated, the transient command calculation, $\theta_{tr}$ may be completed. Referring to FIG. 2, the derivative is multiplied by the derivative gain K at block 46. The derivative gain K is determined as a function of vehicle speed and is stored as a look-up table in controller unit 24. A sample derivative gain table appears in FIG. 5. The shape of the curve in FIG. 5 is determined empirically by maneuvering the vehicle and adjusting the gain to obtain the optimum vehicle response. It presents a baseline for determining the transient response at a given vehicle speed. The derivative in effect determines a factor by which to multiply the gain, that is, how much to increase the authority of the transient command. If the steering wheel is held steady while the vehicle is turning, the derivative will be 0, and $\theta_{tr}$ will also be 0. If the steering wheel is being turned quickly, as during an abrupt turning maneuver, the rate of change of the front wheel position will be greater than in a less abrupt maneuver, and the derivative will be larger, giving the transient command greater authority.

To complete the development of $\theta_f$, the transient command $\theta_{tr}$ is subtracted from the steady state command $\theta_{ss}$. $\theta_{tr}$ is subtracted because the rear wheel steady state steering command $\theta_{ss}$ will be in phase with the front wheels over the range of speeds where it is desired that the rear wheels steer temporarily out of phase with the front wheels. For the rear steering to be out of phase it is necessary to combine it with a steering angle that will be of the opposite sign, in the out of phase direction, to develop such a command. On the recovery from a transient maneuver, when the front wheels are steered back in the opposite direction of the maneuver, the sign of the derivative will be reversed. Subtracting a negative number produces a positive number, so that $\theta_r$ will be positive or in phase to aid recovery. In maneuvers where the steering wheel is turned more gradually, the derivative will be less in magnitude than it would be during a maneuver where the wheel is moved quickly because the rate of change will not be as great. In such instances the phase reversal will have much less effect and the wheels will not be steered as far out of phase, if at all.

In any event, choosing the number of samples according to vehicle speed as described above allows for varying the overall effect of the rear wheel steer command on vehicle handling over a range of speeds. At medium speeds, the reversal effect of the rear wheel steer command will be greater. At higher vehicle speeds, stability is maintained because the rear wheel steering command responds to the front wheel positioning in a manner directly related to the immediate front wheel behavior during the maneuver.

While this invention has been described in reference to the illustrated embodiment, it will be understood that the scope of the present invention is not limited thereto. Various modifications to the illustrated embodiment may occur to those skilled in the art, and it should be understood that systems incorporating such modifications may also fall within the scope of this invention, which is defined by the appended claims.

The embodiments of the invention in which an exclusive property or privilege is claimed are defined as follows:

1. In a vehicle steering system having a pair of front wheels which are steered by operator rotation of a handwheel to initiate a steering maneuver, and a pair of rear wheels which are steered in accordance with a rear wheel steering command, a method for developing the rear wheel steering command, comprising the steps of:
    developing a steady state rear wheel steering command as a function of vehicle speed and front wheel steering angle for producing steady state rear wheel steering which is in phase with the front wheel steering angle when the vehicle is relatively high;
    obtaining and temporarily storing samples of the front wheel steering angle at periodic intervals;
    computing differences between samples taken at consecutive periodic intervals to produce a measure of the change of front wheel steering angle during a respective sample interval;
    determining a front wheel steering rate by summing a specified number of said computed differences;
    modifying the steady state command in accordance with the determined front wheel steering rate so as to increase yawing of said vehicle upon initiation of the steering maneuver, such modification having a time response which is variable with the number of computed differences summed in such determination; and
    varying said specified number of computed differences as a function of vehicle speed to thereby vary the time response of said modification with vehicle speed.

2. The method set forth in claim 1, wherein the step of varying said specified number of computed differences includes the steps of:
    summing a decreasing number of computed differences with increasing vehicle speeds when determining the front wheel steering rate to thereby decrease the time response of said modification with increasing vehicle speed; and
    summing an increasing number of computed differences with decreasing vehicle speeds when determining the front wheel steering rate to thereby increase the time response of said modification with decreasing vehicle speed.

* * * * *